US012572689B2

(12) United States Patent　　(10) Patent No.:　US 12,572,689 B2

Maeda　　(45) Date of Patent:　Mar. 10, 2026

(54) AVATAR MANAGEMENT SYSTEM, AVATAR MANAGEMENT METHOD, AND STORAGE MEDIUM

(71) Applicant: CANON KABUSHIKI KAISHA, Tokyo (JP)

(72) Inventor: Muneyoshi Maeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 18/436,051

(22) Filed: Feb. 8, 2024

(65) Prior Publication Data

US 2024/0281560 A1　　Aug. 22, 2024

(30) Foreign Application Priority Data

Feb. 22, 2023　(JP) ................................. 2023-026414

(51) Int. Cl.
　*G06F 21/62*　　(2013.01)
　*G06T 13/40*　　(2011.01)
(52) U.S. Cl.
　CPC .......... *G06F 21/6245* (2013.01); *G06T 13/40*
　　(2013.01); *G06F 2221/2141* (2013.01)
(58) Field of Classification Search
　CPC ......... G06F 21/6245; G06F 2221/2141; G06F
　　21/604; G06F 21/6263; G06T 13/40;
　　G06Q 50/01; G06Q 10/10
　See application file for complete search history.

(56) References Cited

U.S. PATENT DOCUMENTS 10,235,008 B2　　3/2019　Lee
2008/0052242 A1*　2/2008　Merritt ..................... G06F 21/10
　　　　705/51

(Continued)

FOREIGN PATENT DOCUMENTS

JP　　　2020-39109 A　　3/2020
JP　　　2021-103509 A　　7/2021

(Continued)

OTHER PUBLICATIONS

Great Britain Office action dated Jul. 22, 2024 issued during prosecution of related Great Britain Patent Application No. GB2401077.0.

(Continued)

*Primary Examiner* — Javier O Guzman
(74) *Attorney, Agent, or Firm* — VENABLE LLP

(57)　　ABSTRACT

There is provided an avatar management system. A setting unit sets management information indicating, for each of a plurality of users different from a first user, whether the user is permitted to display a first avatar associated with the first user. A transmission unit transmits, based on the management information, an avatar of the first user to a second user terminal of a second user among the plurality of users. The transmission unit transmits the first avatar as the avatar of the first user if the management information indicates that the second user is permitted display of the first avatar. The transmission unit transmits a second avatar associated with the first user as the avatar of the first user if the management information indicates that the second user is not permitted to display the first avatar.

12 Claims, 7 Drawing Sheets

(56) References Cited

U.S. PATENT DOCUMENTS

| | | | |
|---|---|---|---|
| 2009/0144282 A1* | 6/2009 | Uramoto ............ | G06F 21/6218 |
| | | | 707/999.009 |
| 2010/0115426 A1 | 5/2010 | Liu | |
| 2010/0313138 A1 | 12/2010 | Pare | |
| 2011/0060744 A1* | 3/2011 | Brignull ................ | G06Q 10/10 |
| | | | 707/E17.108 |
| 2013/0239227 A1* | 9/2013 | Evans ................ | G06F 21/6236 |
| | | | 726/27 |
| 2015/0238875 A1* | 8/2015 | Fear ...................... | A63F 13/355 |
| | | | 463/33 |
| 2017/0153863 A1 | 6/2017 | Shiraishi | |
| 2017/0339123 A1* | 11/2017 | Nathan .................. | H04L 63/08 |
| 2018/0338164 A1* | 11/2018 | Baughman ......... | H04N 21/4758 |
| 2021/0339143 A1 | 11/2021 | Bar-Zeev | |
| 2022/0263781 A1* | 8/2022 | Lee ......................... | H04L 51/10 |
| 2022/0335145 A1 | 10/2022 | Iwaki | |

FOREIGN PATENT DOCUMENTS

| | | | |
|---|---|---|---|
| KR | 10-2007-0014408 A | 2/2007 | |
| WO | 2024/106051 A1 | 5/2024 | |

OTHER PUBLICATIONS

Indian Office Action issued Aug. 13, 2025 during prosecution of Indian Patent Application No. 202444010863 (English language machine translation included).

* cited by examiner

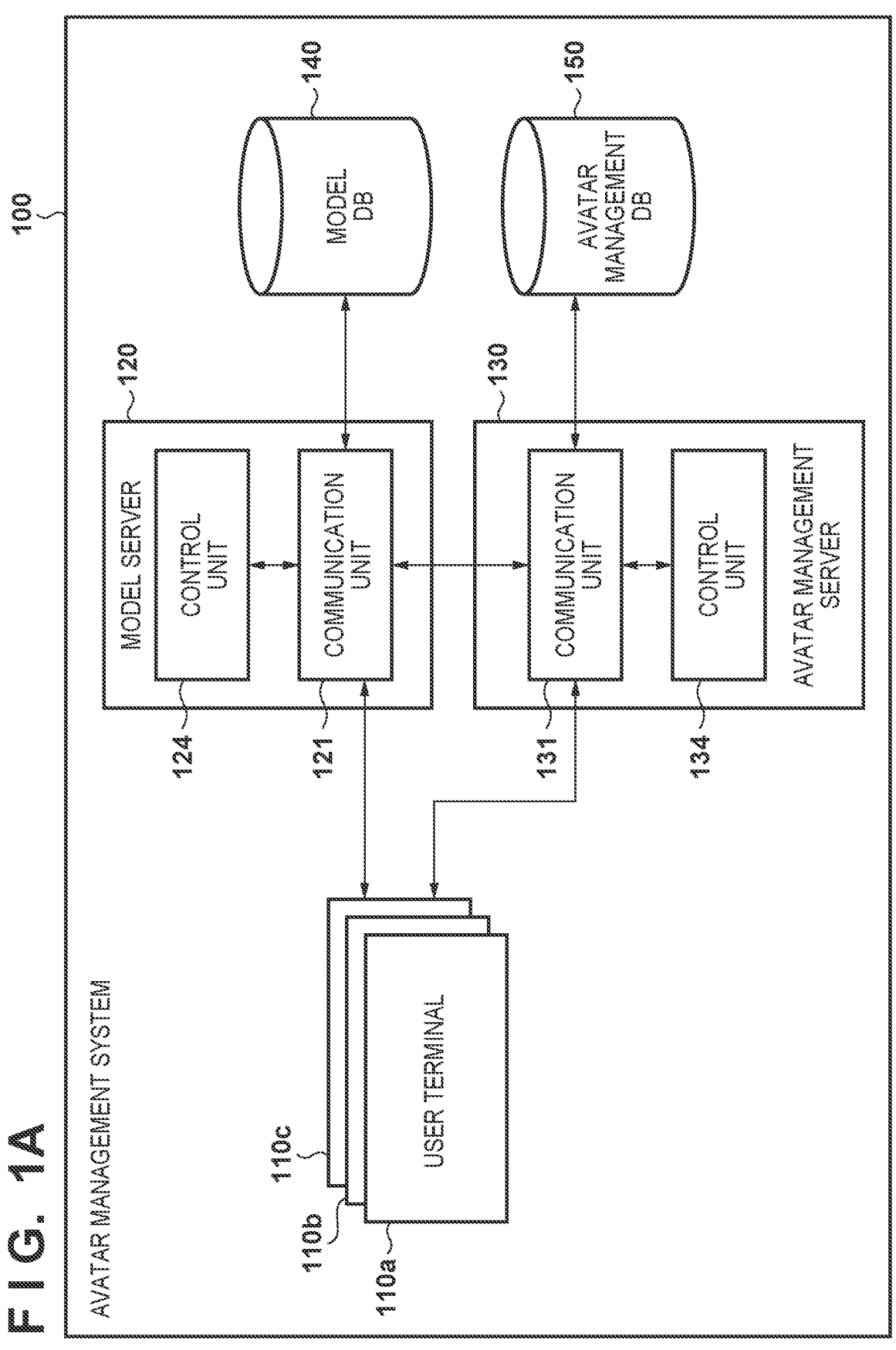
F I G. 1A

F I G. 1B

110

USER TERMINAL

COMMUNICATION UNIT ~111

114

CONTROL UNIT

RENDERING UNIT ~112

DISPLAY UNIT ~113

F I G. 2

150 AVATAR MANAGEMENT DB

| USER ID (151) | AVATAR ID (152) | PERMITTED USER ID (153) |
|---|---|---|
| U1000010 | A1000010 | U1000011:U1000012 |
| U1000010 | A1000011 | U1000013:U1000014 |
| U1000010 | A1000012 | Others |
| U1000020 | A1000020 | U1000021 |
| U1000020 | A1000021 | Others |

⋮

140 MODEL DB

| AVATAR ID (141) | AVATAR DATA (142) | AVATAR ID (141) | AVATAR DATA (142) |
|---|---|---|---|
| A1000010 | | A1000020 | |
| A1000011 | | A1000021 | |
| A1000012 | | | |

⋮

F I G. 3
150
AVATAR MANAGEMENT DB
| USER ID 151 | AVATAR ID 152 | PERMITTED USER ID 153 |
|---|---|---|
| U1000010 | A1000010 | U1000011:U1000012 |
| | A1000011 | U1000013:U1000014 |
| | A1000012 | Others |
| U1000020 | A1000020 | U1000021 |
| | A1000021 | Others |
⋮
DISPLAY UNIT OF USER ID "U1000010"
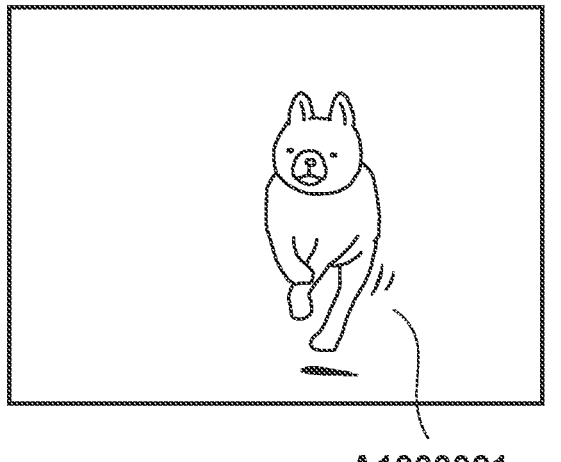
A1000021
DISPLAY UNIT OF USER ID "U1000020"
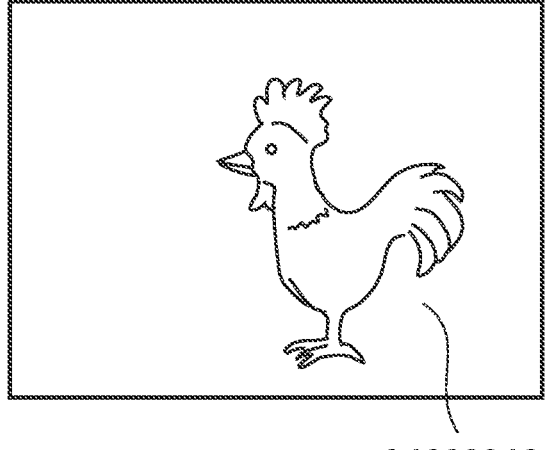
A1000012

F I G. 4
150
AVATAR MANAGEMENT DB
| USER ID | AVATAR ID | PERMITTED USER ID |
|---------|-----------|-------------------|
| U1000010 | A1000010 | U1000011:U1000012 |
| | A1000011 | U1000013:U1000014 |
| | A1000012 | Others |
| U1000020 | A1000020 | U1000021:U1000010 |
| | A1000021 | Others |
151   152   153
⋮
DISPLAY UNIT OF USER ID "U1000010"
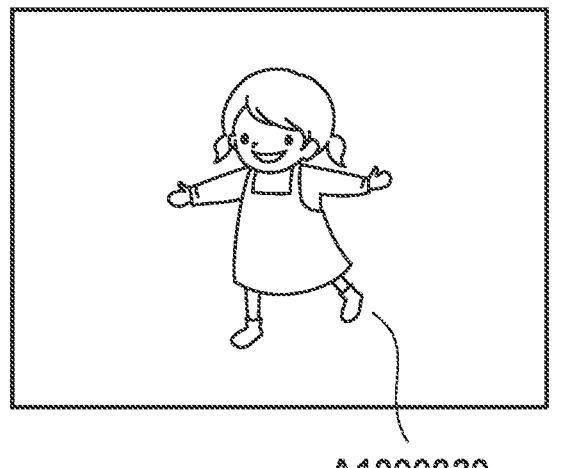
A1000020
DISPLAY UNIT OF USER ID "U1000020"
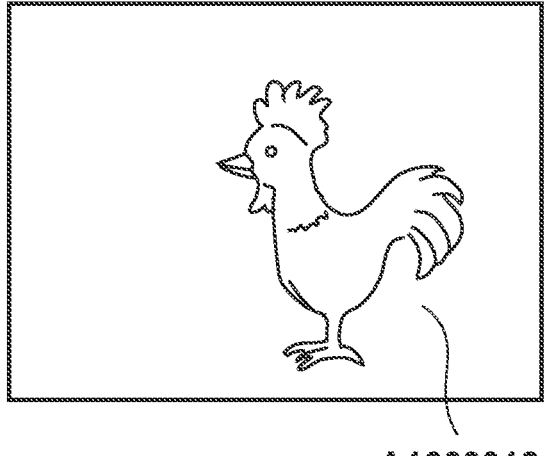
A1000012

F I G. 5
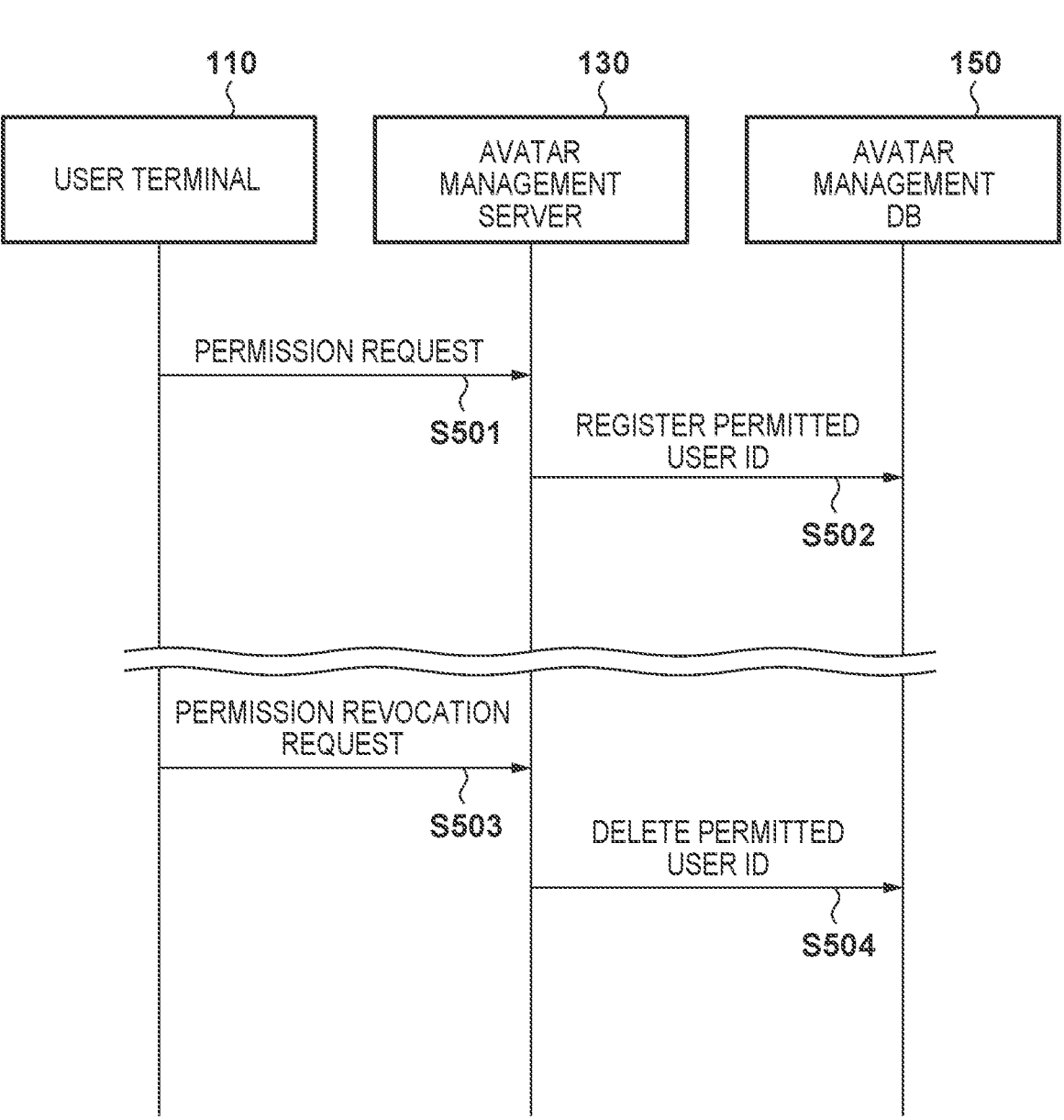

AVATAR MANAGEMENT SYSTEM, AVATAR MANAGEMENT METHOD, AND STORAGE MEDIUM

BACKGROUND OF THE INVENTION

Field of the Invention

The present invention relates to an avatar management system, an avatar management method, and a storage medium.

Description of the Related Art

Conventionally, users use avatars that serve as their alter ego for activities in virtual spaces such as the metaverse. For example, in recent years, virtual shopping in which users displayed as avatars shop in virtual spaces has become popular. Also, virtual fitting has appeared in which users try on clothes using their avatar. Here, the avatar that is used is often created from personal information such as the body shape and appearance of the user in the real world. Also, users who are in a close relationship such as family and friends may conceivably want to partake in activities together using avatars created from real-world personal information.

In the case of using avatars created from real-world personal information, users expose their privacy to third parties. It follows that there is a possibility that avatars in virtual spaces may lead to identification of individuals in the real world, and a possibility that display of avatars in virtual spaces may evolve into privacy issues.

Japanese Patent Laid-Open No. 2020-039109 and Japanese Patent Laid-Open No. 2021-103509 are known documents that disclose technologies for controlling display in virtual spaces. Japanese Patent Laid-Open No. 2020-039109 discloses a technology according to which a terminal of a streamer, by setting whether display of a specific object in a virtual space is permitted/prohibited on the terminals of viewers, ensures that the object is not displayed on the terminals of viewers with respect to which display is not permitted. Japanese Patent Laid-Open No. 2021-103509 discloses a technology that, on the basis of a database in which permitted/prohibited is registered for display of an object in a virtual space, only displays the object to users whose user ID is set to permitted.

In light of the privacy issues relating to avatars, consider the case where permitted/prohibited is set for display of the avatar of a specific user (first user), such as in Japanese Patent Laid-Open No. 2020-039109 and Japanese Patent Laid-Open No. 2021-103509. In this case, another user (second user) who is not permitted to display the avatar is unable to recognize the presence or movement of the avatar of the first user in a virtual space. Thus, communication between the first user and the second user becomes difficult or impossible.

SUMMARY OF THE INVENTION

The present invention has been made in view of such circumstances as those highlighted above. The present invention provides a technology that enables a user to control display of an avatar to other users in the case of wanting to avoid unrestricted public access, while suppressing inconvenience to communication between users in a virtual space.

According to a first aspect of the present invention, there is provided an avatar management system comprising: a setting unit configured to set management information indicating, for each of a plurality of users different from a first user, whether the user is permitted to display a first avatar associated with the first user; and a transmission unit configured to transmit, based on the management information, an avatar of the first user to a second user terminal of a second user among the plurality of users, wherein the transmission unit transmits the first avatar as the avatar of the first user if the management information indicates that the second user is permitted display of the first avatar, and the transmission unit transmits a second avatar associated with the first user as the avatar of the first user if the management information indicates that the second user is not permitted to display the first avatar. Optional or preferable features are set out in claims 2 to 12.

According to a second aspect of the present invention, there is provided an avatar management method executed by an avatar management system, comprising: setting management information indicating, for each of a plurality of users different from a first user, whether the user is permitted to display a first avatar associated with the first user; and transmitting, based on the management information, an avatar of the first user to a second user terminal of a second user among the plurality of users, wherein the transmitting transmits the first avatar as the avatar of the first user if the management information indicates that the second user is permitted display of the first avatar, and the transmitting transmits a second avatar associated with the first user as the avatar of the first user if the management information indicates that the second user is not permitted to display the first avatar. Optional or preferable features of the second aspect will be apparent from the features of claims 2 to 12.

According to a third aspect of the present invention, there is provided a non-transitory computer-readable storage medium which stores a program for causing a computer to execute an avatar management method comprising: setting management information indicating, for each of a plurality of users different from a first user, whether the user is permitted to display a first avatar associated with the first user; and transmitting, based on the management information, an avatar of the first user to a second user terminal of a second user among the plurality of users, wherein the transmitting transmits the first avatar as the avatar of the first user if the management information indicates that the second user is permitted display of the first avatar, and the transmitting transmits a second avatar associated with the first user as the avatar of the first user if the management information indicates that the second user is not permitted to display the first avatar.

Further features of the present invention will become apparent from the following description of exemplary embodiments with reference to the attached drawings.

BRIEF DESCRIPTION OF THE DRAWINGS

FIG. 1A is a diagram showing an example configuration of an avatar management system 100.

FIG. 1B is a diagram showing an example configuration of a user terminal 110.

FIG. 2 is a diagram showing example data structures of an avatar management DB 150 and a model DB 140.

FIG. 3 is a diagram illustrating an example display of avatars of other users on the user terminal 110 of each user and the corresponding avatar management database.

FIG. 4 is a diagram illustrating an example display of avatars of other users on the user terminal 110 of each user and the corresponding avatar management database.

FIG. 5 is a sequence diagram of processing for setting the avatar management DB 150.

DESCRIPTION OF THE EMBODIMENTS

Figure 6:
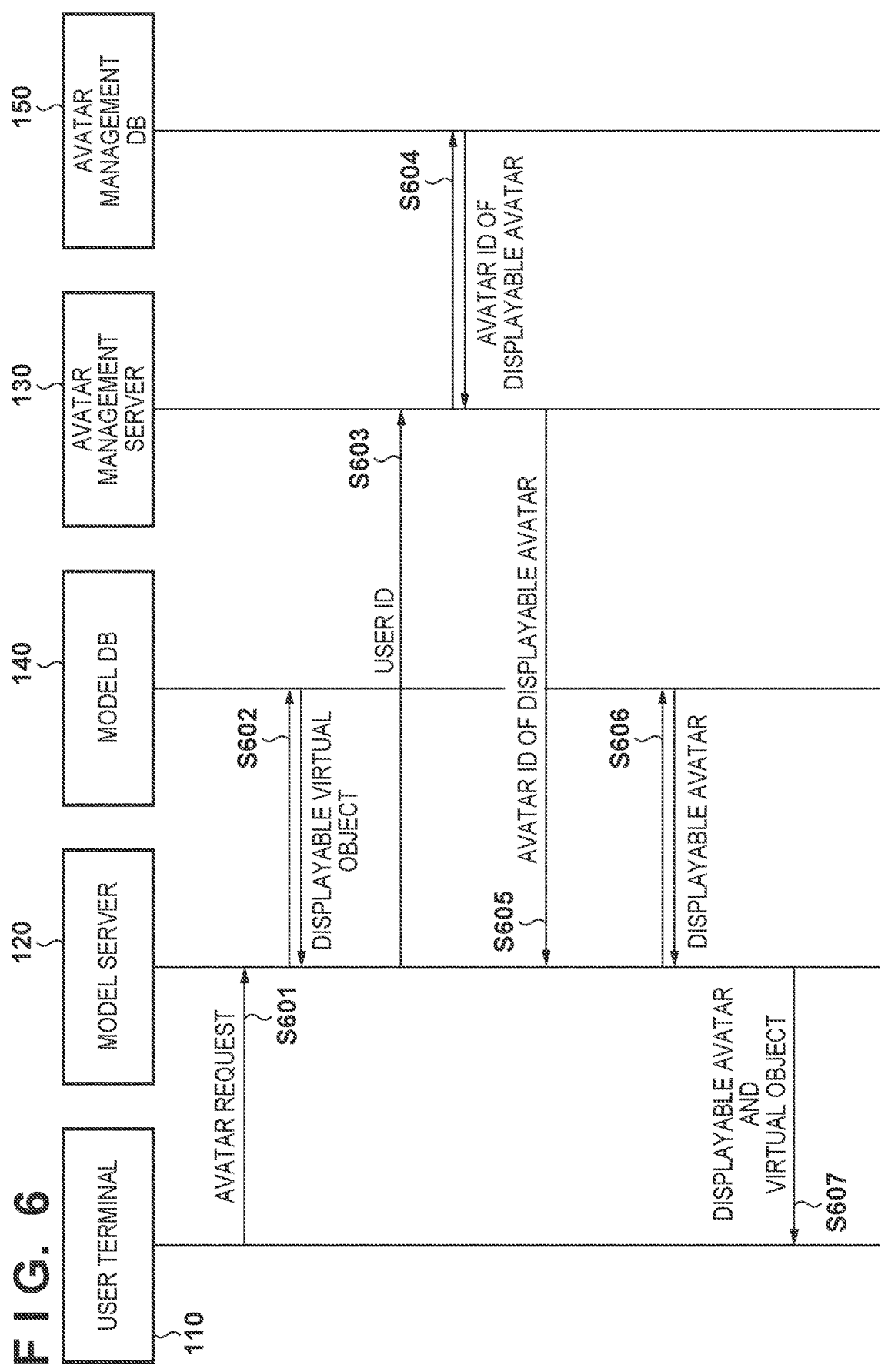
FIG. 6 is a sequence diagram of avatar display processing.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, a technology relating to display of avatars that are used in virtual spaces such as the metaverse will be described. Here, a virtual space is a two-dimensional or three-dimensional space that is represented by images displayed on a computer. Also, by using a display device such as a head-mounted display (HMD), users are able to experience augmented reality, virtual reality or mixed reality. An avatar is an alter ego of a user represented by a computer. Avatars are generally represented by two-dimensional or three-dimensional computer graphics, rather than being images taken of the users themselves. Example Configuration of Avatar Management System 100

Figure 1B:
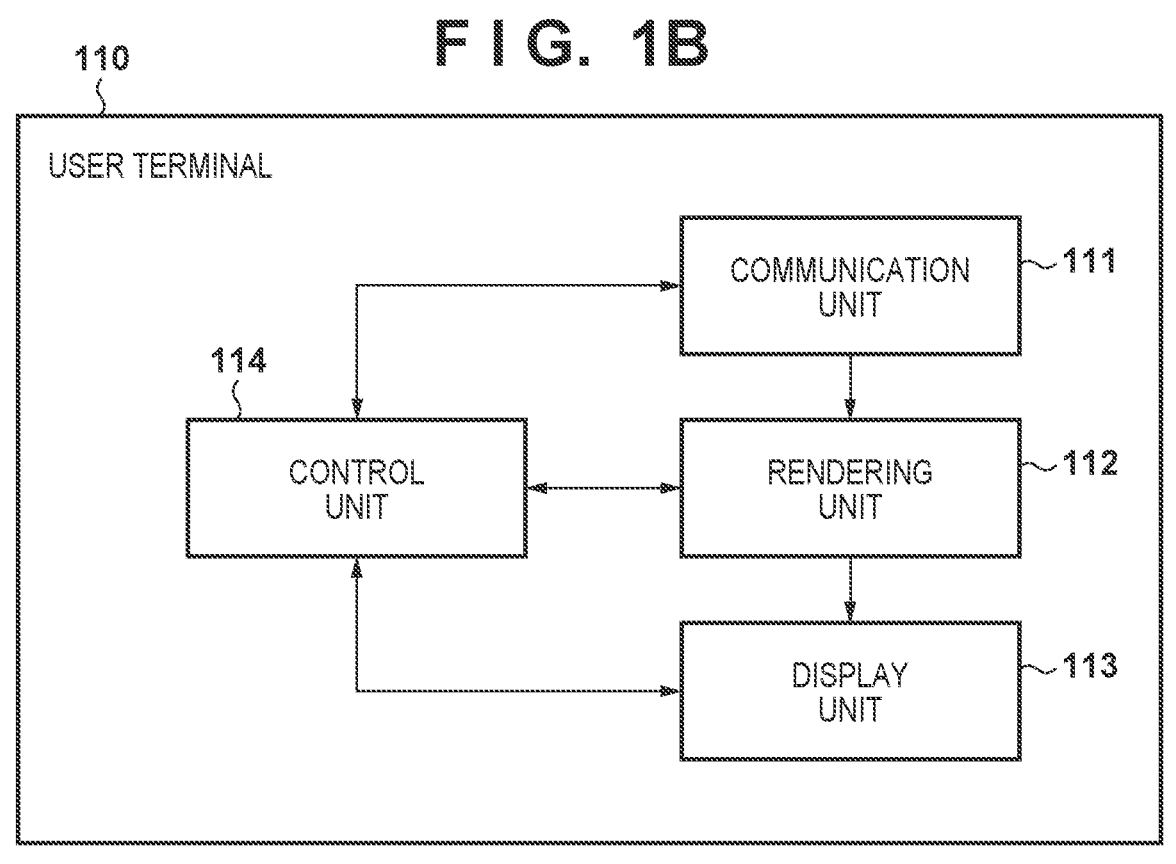

FIG. 1A is a diagram showing an example configuration of an avatar management system 100. The avatar management system 100 includes a plurality of user terminals, a model server 120, an avatar management server 130, a model database (model DB 140) and an avatar management database (avatar management DB 150). The device storing the model DB 140 and the avatar management DB 150 is not particularly limited. For example, the model DB 140 may be stored on a recording medium provided in the model server 120, or may be stored on a file server accessible by the model server 120. Similarly, the avatar management DB 150 may be stored on a recording medium provided in the avatar management server 130, or may be stored on a file server accessible by the avatar management server 130.

Note that, in FIG. 1A, the model server 120 and the avatar management server 130 are shown as separate servers, but, in the present embodiment, the configuration of the avatar management system 100 is not limited to the configuration shown in FIG. 1A. For example, the model server 120 may be additionally provided with the functions of the avatar management server 130.

FIG. 1A illustrates three user terminals (user terminals 110a, 110b, 110c) as examples of the plurality of user terminals. However, the number of user terminals included in the avatar management system 100 is not particularly limited, and may be two or may be four or more. In the following description, "user terminal 110" will be used to collectively refer to the user terminals, when strictly distinguishing between individual user terminals is not necessary.

The model server 120 is provided with a communication unit 121 and a control unit 124. The control unit 124 includes a ROM and a RAM, and performs overall control of the model server 120 by executing a control program stored on the ROM using the RAM as a work memory. The control unit 124 is able to communicate with the user terminal 110, the avatar management server 130 and the model DB 140, via the communication unit 121.

In the following description, processing described as being executed by the model server 120 is realized by the control unit 124 of the model server 120 executing the control program stored on the ROM, unless specified otherwise.

The avatar management server 130 is provided with a communication unit 131 and a control unit 134. The control unit 134 includes a ROM and a RAM, and performs overall control of the avatar management server 130 by executing a control program stored on the ROM using the RAM as a work memory. The control unit 134 is able to communicate with the user terminal 110, the model server 120 and the avatar management DB 150, via the communication unit 131.

In the following description, processing described as being executed by the avatar management server 130 is realized by the control unit 134 of the avatar management server 130 executing the control program stored on the ROM, unless specified otherwise.

FIG. 1B is a diagram showing an example configuration of the user terminal 110. The user terminal 110 is provided with a communication unit 111, a rendering unit 112, a display unit 113 and a control unit 114. The control unit 114 includes a ROM and a RAM, and performs overall control of the user terminal 110 by executing a control program stored on the ROM using the RAM as a work memory. The control unit 114 is able to communicate with the model server 120 and the avatar management server 130, via the communication unit 111.

In the following description, processing described as being executed by the user terminal 110 is realized by the control unit 114 of the user terminal 110 executing the control program stored on the ROM, unless specified otherwise.
Example Data Structures of Avatar Management DB 150 and Model DB 140

FIG. 2 is a diagram showing example data structures of the avatar management DB 150 and the model DB 140. First, the avatar management DB 150 (management information) will be described. As shown in FIG. 2, the avatar management DB 150 includes User ID 151, Avatar ID 152 and Permitted User ID 153. User ID 151 includes a user ID (user identification information) for each of a plurality of users of a virtual space service provided by the avatar management system 100. In the following description, the user ID of the user of the user terminal 110a is "U1000010", and the user ID of the user of the user terminal 110b is "U1000020". Also, although not illustrated, User ID 151 also includes the user ID of the user of the user terminal 110c. A group ID is also defined as an ID that can be stored and managed in the same area as User ID 151. The group ID is represented by "G1000010", for example, and is used in order to at once manage and control the authority of a plurality of users belonging to the group corresponding to the group ID, in accordance with a list of one or more user IDs linked by respective group IDs that are managed separately.

Avatar ID 152 includes an avatar ID (avatar identification information) for each of a plurality of avatars that are managed by the model DB 140. In the avatar management DB 150, each user ID is associated with a plurality of avatar IDs. For example, in FIG. 2, the user ID "U1000010" is associated with avatar IDs "A1000010", "A1000011" and "A1000012". In a virtual space, each user is displayed as an avatar corresponding to one of the avatar IDs associated with his or her user ID.

Permitted User ID 153 includes, for each avatar of each user, the user IDs of other users who are permitted to display the avatar. For example, in FIG. 2, the avatar ID "A1000010" associated with the user ID "U1000010" is associated with user IDs "U1000011" and "U1000012" in Permitted User ID 153. This indicates that the users having the user IDs "U1000011" and "U1000012" are permitted to display the avatar corresponding to the avatar ID "A1000010". Here, the aforementioned group ID "G1000010" may be set in Permitted User ID 153. In this case, users whose user ID is separately associated with the group ID "G1000010" will be permitted users. Also, in the case where user IDs associated with a group ID are managed separately, permitted users are, in effect, added or deleted as a result of associated user IDs being added or deleted by separate editing of the group ID. Also, as shown in FIG. 2, "Others" appears at a position corresponding to the avatar ID "A1000012" in the Permitted User ID 153 column. This indicates that users who are not permitted to display either of the two avatars corresponding to the avatar IDs "A1000010" and "A1000011" are permitted to display the avatar corresponding to the avatar ID "A1000012". That is, the avatar corresponding to the avatar ID "A1000012" is an avatar that is displayed by default (avatar whose display is, in effect, unrestricted).

In the following description, avatars that are only displayed for permitted users, such as the avatars having the avatar IDs "A1000010", "A1000011" and "A1000020", will be referred to as "limitedly-public avatars". Also, avatars that are displayed by default (avatars whose display is, in effect, unrestricted) such as the avatars having the avatar IDs "A1000012" and "A1000021" will be referred to as "public avatars".

In the avatar management DB 150, at least one public avatar is associated with each user ID, and one or more limitedly-public avatars can be associated with each user ID depending on the settings. Also, the avatar management DB may be organized such that public and limitedly-public avatars can be set for each service, assuming that users collectively manage avatars that are used in a plurality of services provided on different platforms, for example. In this case, IDs for which various services are specified are further defined as service IDs, and user IDs and avatar IDs are set for each service ID.

A limitedly-public avatar is an avatar with respect to which the user wants to avoid unrestricted public access to other users. A public avatar is an avatar with respect to which the user does not wish to restrict public access to other users. Which avatars to set as limitedly-public avatars and which avatars to set as public avatars is up to the user, and there are no particular limitations in this regard. Whether or not privacy can be specified by an avatar does not necessarily depend on whether the avatar includes privacy-related information. For example, even in the case of certain generic avatars, if the avatars reside in a specific virtual space with specific ornaments, individuals (groups) can be specified by users who have knowledge of past use histories or the like. That is, no matter what avatar is set, users can be specified by factors such as the surrounding environment in which the avatar exists, the user's actions and the like that are not directly related to the type of avatar.

In the following description, as an example, limitedly-public avatars are assumed to be avatars that include a large amount of information related to the user's privacy, compared to public avatars. For example, limitedly-public avatars are avatars generated based on information (first information) having the capacity to facilitate identification of the user in the real world. Information having the capacity to facilitate identification of the user in the real world includes body type, appearance, age, preferences and gender. Also, information having the capacity to facilitate identification of the user in the real world may include images taken of the user.

Information "having the capacity to facilitate identification of the user in the real world" means that the user in the real world is uniquely identified by the information or at least distinguished from specific other users. For example, even if a user is specified as being 30 years old, the user is not necessarily uniquely identified, but that user is distinguished from users whose age is different. Accordingly, age equates to information "having the capacity to facilitate identification of the user in the real world."

In the present embodiment, public avatars are avatars generated based on information (second information) having a low capacity to facilitate identification of the user in the real world, compared to limitedly-public avatars. "Information having a low capacity to facilitate identification of the user in the real world" as referred to here includes information that does not have the capacity to facilitate identification of the user in the real world. For example, in comparison to a limitedly-public avatar generated based on images taken of the user, an avatar generated based on the user's age and an avatar generated based on information unrelated to the user (e.g., avatar having avatar ID "A1000012" shown in FIG. 2) can both be public avatars. These public avatars and avatars that can be set as limitedly-public avatars are set by the respective users when editing the avatar management DB 150. In the step of setting a public avatar, the user selects from a plurality of public avatar candidates that are presented (displayed). Also, in the step of setting a limitedly-public avatar, the user selects from a plurality of avatar candidates for private use that are presented (displayed). Also, avatars having different access ranges may be displayed within the same virtual space such that other users are aware of (can distinguish) the access range.

Next, the model DB 140 will be described. The model DB 140 includes Avatar ID 141 and Avatar Data 142. Avatar ID 141 includes an avatar ID (avatar identification information) for each of the plurality of avatars managed by the model DB 140, similarly to Avatar ID 152.

Avatar Data 142 includes display data for each of the plurality of avatars managed by the model DB 140.

In the case where a plurality of limitedly-public avatars are associated with a specific user, the limitedly-public avatars are arranged in the avatar management DB 150 in decreasing order of the amount of information related to the user's privacy. In the example of FIG. 2, the avatar IDs "A1000010" and "A1000011" associated with the user ID "U1000010" both correspond to limitedly-public avatars, but with regard to the avatar ID "A1000011", information related to the user's privacy is limited to only gender.

Example Display of Avatars

Example display of the avatars of other users on the user terminal 110 of each user will now be described, with reference to FIGS. 3 and 4.

First, the example display in FIG. 3 will be described. In Permitted User ID 153, the user ID "U1000020" is not included at the position corresponding to "U1000010" in User ID 151. Accordingly, the user ID "U1000020" is not permitted to display the limitedly-public avatars of the user ID "U1000010". Similarly, in Permitted User ID 153, the user ID "U1000010" is not included at the position corresponding to "U1000020" in User ID 151. Accordingly, the user ID "U1000010" is not permitted to display the limitedly-public avatar of the user ID "U1000020". As a result, the public avatar (avatar ID "A1000021") of the user ID "U1000020" is displayed on the display unit 113 of the user terminal 110*a* corresponding to the user ID "U1000010". Similarly, the public avatar (avatar ID "A1000012") of the user ID "U1000010" is displayed on the display unit 113 of the user terminal 110*b* corresponding to the user ID "U1000020".

Next, the example display in FIG. 4 will be described. In FIG. 4, compared to FIG. 3, the user ID "U1000010" is newly associated with the avatar ID "A1000020" corresponding to "U1000020" in User ID 151. Accordingly, the user ID "U1000010" is permitted to display the limitedly-public avatar (avatar ID "A1000020") of the user ID "U1000020". As a result, the limitedly-public avatar (avatar ID "A1000020") of the user ID "U1000020" is displayed on the display unit 113 of the user terminal 110*a* corresponding to the user ID "U1000010".

Overview of Avatar Display Processing

An overview of avatar display processing performed in the avatar management system 100 will now be described, with reference to FIGS. 1A and 1B. Here, the case of displaying an avatar in the user terminal 110*b* will be described, but similar processing is also performed in the case of displaying an avatar in the other user terminals 110.

The user terminal 110*b* transmits a request for transmission of an avatar (avatar request) to the model server 120. Here, the avatar request also serves as a request for transmission of a virtual object. A virtual object is an object (e.g., furniture, building, etc.) other than an avatar that is displayed in a virtual space. The model DB 140 may store virtual objects in addition to avatars.

In response to the avatar request, the model server 120 acquires a virtual object displayable by the user of the user terminal 110*b* from the model DB 140. Also, the model server 120, by transmitting the user ID (identification information) of the user of the user terminal 110*b* to the avatar management server 130, asks for information relating to an avatar displayable by the user terminal 110*b* (avatar that the user of the user terminal 110*b* is permitted to display).

The avatar management server 130, by searching the avatar management DB 150 for an avatar ID associated with the user ID received from the model server 120, acquires the avatar ID of an avatar that the user of the user terminal 110*b* is permitted to display. The avatar management server 130 transmits the avatar ID of the avatar that the user of the user terminal 110*b* is permitted to display to the model server 120.

The model server 120 acquires the avatar displayable by the user of the user terminal 110*b* (avatar that the user of the user terminal 110*b* is permitted to display) from the model DB 140, based on the avatar ID notified by the avatar management server 130.

Thereafter, the model server 120 transmits the avatar and virtual object acquired from the model DB 140 to the user terminal 110*b*.

In the user terminal 110*b*, the avatar and virtual object received from the model server 120 are passed to the rendering unit 112. The rendering unit 112, by performing rendering processing based on data of the avatar and virtual object, generates data in a format displayable on the display unit 113 and outputs the generated data to the display unit 113. The avatar and virtual object are thereby displayed on the display unit 113 of the user terminal 110*b*.

Processing for Setting Avatar Management DB 150

FIG. 5 is a sequence diagram of processing for setting the avatar management DB 150. Here, the case where the user (first user) of the user terminal 110*a* (first user terminal) requests setting of the avatar management DB 150 with regard to his or her own limitedly-public avatars will be described. However, similar processing is also performed in the case where the users of other user terminals 110 request setting of the avatar management DB 150 with regard to their own limitedly-public avatars.

In step S501, the user terminal 110*a* designates a specific user from among the plurality of users of the virtual space service provided by the avatar management system 100, in accordance with an operation by the user. Also, the user terminal 110*a* designates a specific limitedly-public avatar from among the one or more limitedly-public avatars associated with the user, in accordance with an operation by the user. The user terminal 110*a* then transmits, to the avatar management server 130, a request (permission request) for permission for the designated user to display the limitedly-public avatar. The permission request includes the user ID/group ID of the designated user (e.g., "U1000020"/"G1000010") and the avatar ID of the designated limitedly-public avatar (e.g., "A1000010"). The avatar management server 130 receives the permission request transmitted by the user terminal 110*a*.

In step S502, the avatar management server 130 accesses the avatar management DB 150. Then, the avatar management server 130, by adding the user ID included in the permission request to the position in Permitted User ID 153 corresponding to the avatar ID included in the permission request, associates the user ID included in the permission request with the avatar ID included in the permission request. The avatar management DB 150 is thereby set so as to indicate that the user designated by the user of the user terminal 110*a* is permitted to display the limitedly-public avatar.

Next, consider the case where the user of the user terminal 110*a* wants to revoke permission for a specific user to display a limitedly-public avatar. In this case, in step S503, the user terminal 110*a* designates a specific user from among the plurality of users of the virtual space service provided by the avatar management system 100, in accordance with an operation by the user. Also, the user terminal 110*a* designates a specific limitedly-public avatar from among the one or more limitedly-public avatars associated with the user, in accordance with an operation by the user. The user terminal 110*a* then transmits a request (revocation request) for revocation of permission for the designated user to display the designated limitedly-public avatar to the avatar management server 130. The revocation request includes the user ID (e.g., "U1000020") of the designated user and the avatar ID (e.g., "A1000010") of the designated limitedly-public avatar. The avatar management server 130 receives the revocation request transmitted by the user terminal 110*a*.

In step S504, the avatar management server 130 accesses the avatar management DB 150. Then, the avatar management server 130, by deleting the user ID included in the revocation request from the position in Permitted User ID 153 corresponding to the avatar ID included in the revocation request, releases the association of the user ID included in the revocation request with the avatar ID included in the revocation request. The avatar management DB 150 is thereby set so as to indicate that the user designated by the user of the user terminal 110*a* is not permitted to display the limitedly-public avatar.

Note that, here, a configuration is described in which the avatar management server 130 sets the avatar management DB 150, with regard to the user's own limitedly-public avatars, in response to a request from the user. However, the present embodiment is not limited to such a configuration, and the avatar management server 130 may set the avatar management DB 150 on a basis independent of a request from the user. For example, in the case where the avatar management server 130 is able to acquire information indicating a family relationship between users, the avatar management server 130 may set the avatar management DB 150 to permit users in the same family to display limitedly-public avatars to each other.

Sequence of Avatar Display Processing

FIG. 6 is a sequence diagram of avatar display processing. Here, the case of displaying an avatar in the user terminal 110b (second user terminal) will be described, but similar processing is also performed in the case of displaying avatars in the other user terminals 110.

In step S601, the user terminal 110b transmits, to the model server 120, a request (avatar request) for transmission of an avatar. Here, the avatar request also serves as a request for transmission of a virtual object.

In step S602, the model server 120 acquires a virtual object displayable by the user terminal 110 from the model DB 140.

In step S603, the model server 120, by transmitting the user ID (identification information) of the user (second user) of the user terminal 110b to the avatar management server 130, asks for information relating to an avatar displayable by the user terminal 110b (avatar that the user of the user terminal 110b is permitted to display).

In step S604, the avatar management server 130, by searching the avatar management DB 150 for an avatar ID associated with the user ID received from the model server 120, acquires the avatar ID of an avatar that the user of the user terminal 110b is permitted to display. For example, in the case where the avatar management DB 150 is structured as shown in FIG. 3, the avatar ID "A1000012" of the avatar that the user (user ID "U1000020") of the user terminal 110b is permitted to display is acquired.

In step S605, the avatar management server 130 transmits the avatar ID acquired in step S604 to the model server 120.

In step S606, the model server 120 acquires, from the model DB 140, the avatar corresponding to the avatar ID received in step S605.

In step S607, the model server 120 transmits the avatar acquired in step S606 and the virtual object acquired in step S602 to the user terminal 110b. In the user terminal 110b, the avatar and virtual object received from the model server 120 are passed to the rendering unit 112. The rendering unit 112, by performing rendering processing based on data of the avatar and virtual object, generates data in a format displayable on the display unit 113 and outputs the generated data to the display unit 113. The avatar and virtual object are thereby displayed on the display unit 113 of the user terminal 110b.

Summary of First Embodiment

As described above, according to the first embodiment, in the avatar management system 100, the avatar management server 130 sets the avatar management DB 150 (management information). User ID 151 of the avatar management DB 150 includes a user ID for each of the plurality of users of the virtual space service provided by the avatar management system 100, and, focusing on a specific user (first user)

among the plurality of users, the avatar management server 130 sets the avatar management DB 150 (management information) which indicates, for each of the plurality of users different from the first user, whether or not to permit the user to display a limitedly-public avatar (first avatar) associated with the first user. The model server 120 transmits the avatar of the first user to the user terminal (e.g., the user terminal 110b) of a second user, based on information of the avatar management DB 150 that is acquired through the avatar management server 130. Specifically, if the avatar management DB 150 indicates that the second user is permitted to display a limitedly-public avatar, the model server 120 transmits a limitedly-public avatar as the avatar of the first user. If the avatar management DB 150 indicates that the second user is not permitted to display a limitedly-public avatar, the model server 120 transmits the public avatar (second avatar) associated with the first user as the avatar of the first user.

In this way, according to the present embodiment, even if the second user is not permitted to display a limitedly-public avatar of the first user, the public avatar of the first user is transmitted to user terminal 110 of the second user. Accordingly, with the present embodiment, it becomes possible for a user to prohibit other users from displaying avatars with respect to which the user wants to avoid unrestricted access, while suppressing inconvenience to communication between users in a virtual space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. Each of the embodiments of the present invention described above can be implemented solely or as a combination of a plurality of the embodiments or features thereof where necessary or where the combination of elements or features from individual embodiments in a single embodiment is beneficial. The scope of the following claims is to be accorded the broadest interpretation so as to encompass all such modifications and equivalent structures and functions as understood by the skilled person to achieve the present invention.

This application claims the benefit of Japanese Patent Application No. 2023-026414, filed Feb. 22, 2023 which is hereby incorporated by reference herein in its entirety.

What is claimed is:

1. An avatar management system comprising:
a processor; and
a memory storing instructions that, when executed by the processor, perform:
setting management information indicating, for each user of a plurality of users different from a first user, whether each user among the plurality of users is permitted to display a first avatar associated with the first user; and
transmitting, based on the management information, an avatar of the first user to a second user terminal of a second user among the plurality of users,
wherein the transmitting transmits the first avatar as the avatar of the first user when the management information indicates that the second user is permitted to display the first avatar, and
the transmitting transmits a second avatar associated with the first user as the avatar of the first user when the management information indicates that the second user is not permitted to display the first avatar,
wherein the first avatar is a limitedly-public avatar generated based on first information having a capacity to facilitate identification of the first user in a real world, and
wherein the second avatar is a public avatar generated based on second information having a lower capacity than the first information to facilitate identification of the first user in the real world.

2. The avatar management system according to claim 1, wherein the first avatar is an avatar with respect to which a range of users that have access to the avatar is more limited than for the second avatar.

3. The avatar management system according to claim 1, wherein the management information includes, for each user, information relating to an avatar associated with the user and information relating to a user permitted to display the avatar.

4. The avatar management system according to claim 1, wherein the transmission unit distinguishably displays, within a same virtual space, a plurality of avatars having different access ranges.

5. The avatar management system according to claim 1, wherein the first information includes an image taken of the first user.

6. The avatar management system according to claim 1, wherein the second information does not have the capacity to facilitate identification of the first user in the real world.

7. The avatar management system according to claim 1, further comprising:
a first receiving step of receiving, from a first user terminal of the first user, a first request for permission for a user designated by the first user from among the plurality of users to display the first avatar,
wherein the setting, in response to the first request, sets the management information to indicate that the designated user is permitted to display the first avatar.

8. The avatar management system according to claim 7, further comprising:

a second receiving step of receiving, from the first user terminal, a second request for revocation of the permission for the designated user to display the first avatar,
wherein the setting, in response to the second request, sets the management information to indicate that the designated user is not permitted to display the first avatar.

9. The avatar management system according to claim 1, wherein the management information is structured to associate, with the first avatar, identification information of a user who is permitted to display the first avatar.

10. The avatar management system according to claim 1, further comprising:
receiving an avatar request from the second user terminal,
wherein the transmitting transmits the first avatar of the first user or the second avatar of the first user to the second user terminal, in response to the avatar request from the second user terminal.

11. An avatar management method executed by an avatar management system, comprising:
a processor; and
a memory storing instructions that, when executed by the processor, perform:
setting management information indicating, for each user of a plurality of users different from a first user, whether each user among the plurality of users is permitted to display a first avatar associated with the first user; and
transmitting, based on the management information, an avatar of the first user to a second user terminal of a second user among the plurality of users,
wherein the transmitting transmits the first avatar as the avatar of the first user when the management information indicates that the second user is permitted to display the first avatar, and
the transmitting transmits a second avatar associated with the first user as the avatar of the first user when the management information indicates that the second user is not permitted to display the first avatar,
wherein the first avatar is a limitedly-public avatar generated based on first information having a capacity to facilitate identification of the first user in a real world,
wherein the second avatar is a public avatar generated based on second information having a lower capacity than the first information to facilitate identification of the first user in the real world.

12. A non-transitory computer-readable storage medium which stores a program for causing a computer to execute an avatar management method comprising:
a processor; and
a memory storing instructions that, when executed by the processor, perform:
setting management information indicating, for each user of a plurality of users different from a first user, whether each user among the plurality of users is permitted to display a first avatar associated with the first user; and
transmitting, based on the management information, an avatar of the first user to a second user terminal of a second user among the plurality of users,
wherein the transmitting transmits the first avatar as the avatar of the first user when the management information indicates that the second user is permitted to display the first avatar, and
the transmitting transmits a second avatar associated with the first user as the avatar of the first user when the management information indicates that the second user is not permitted to display the first avatar, wherein the first avatar is a limitedly-public avatar generated based on first information having a capacity to facilitate identification of the first user in a real world, wherein the second avatar is a public avatar generated based on second information having a lower capacity than the first information to facilitate identification of the first user in the real world.

* * * * *